(12) United States Patent  
Adams

(10) Patent No.: US 7,152,359 B1  
(45) Date of Patent: Dec. 26, 2006

(54) FISHING HOOK RETAINING APPARATUS AND METHOD

(75) Inventor: William W. Adams, Scottsdale, AZ (US)

(73) Assignee: AdamsWW, Inc., Phoenix, AZ (US)

(*) Notice: Subject to any disclaimer, the term of this patent is extended or adjusted under 35 U.S.C. 154(b) by 0 days.

(21) Appl. No.: 11/151,039

(22) Filed: Jun. 13, 2005

(51) Int. Cl.  
*A01K 87/00* (2006.01)

(52) U.S. Cl. ............................................. 43/4.5; 43/25.2

(58) Field of Classification Search ............... 43/25.2, 43/4.5; D22/126, 134, 144  
See application file for complete search history.

(56) References Cited

U.S. PATENT DOCUMENTS

| | | | | |
|---|---|---|---|---|
| 3,484,980 A | * | 12/1969 | Wait | 43/25.2 |
| 3,763,589 A | * | 10/1973 | Werner | 43/25.2 |
| 5,056,256 A | * | 10/1991 | Truax | 43/25.2 |
| 5,220,742 A | * | 6/1993 | Lewis | 43/25.2 |
| 5,430,969 A | * | 7/1995 | Taylor et al. | 43/25.2 |
| 5,505,014 A | * | 4/1996 | Paullin | 43/25.2 |

* cited by examiner

*Primary Examiner*—Kurt Rowan  
(74) *Attorney, Agent, or Firm*—Veronica-Adele Cao; Craig Weiss; Weiss & Moy, P.C.

(57) ABSTRACT

A fishing hook retaining apparatus and method, utilizing a retaining apparatus secured to a shaft of a fishing pole. In one embodiment, the apparatus is a sleeve having a magnet in an interior portion thereof, and a channel extending part of the way through an upper portion thereof. A hook is retained therein by the passage of a portion thereof through the channel, and the contacting of the hook with the magnet. The apparatus may be secured to the shaft, in one embodiment, with an O-ring that is looped over two opposing securing members, and about the shaft of the pole. In another embodiment, the apparatus comprises two upwardly angled opposing sides, with a bar interposed therebetween. In a third embodiment, the apparatus comprises a base having retention ends which couple the apparatus to the shaft of the pole. In yet another embodiment, the apparatus is integral with the shaft of the pole.

14 Claims, 8 Drawing Sheets

US 7,152,359 B1

FISHING HOOK RETAINING APPARATUS AND METHOD

FIELD OF THE INVENTION

The present invention relates to apparatuses and methods for retaining fishing hooks and, more particularly, to embodiments of fishing hook retaining apparatuses and methods that permit the retention of a hook while protecting a fly located thereon.

BACKGROUND OF THE INVENTION

A common problem encountered by fishermen of all skill levels relates to the storage of hooks. There is a need for a convenient means for storing hooks that are not being used, whether on a long-term basis between fishing outings, or during a particular fishing outing when a different hook is being utilized or during a break in fishing. Storage, to be effective and safe, should secure the hook in a place where neither its barb nor point is at significant risk of coming into contact with the hand or other body portion of the fisherman or bystander.

In the area of fly fishing, the problem is made more complicated by the fact that care needs to be taken to not damage a fly during the storage of a hook that is still coupled to a fly. Flies can be delicate and expensive, and the mishandling of a fly can harm it and reduce its effectiveness.

There is a need therefore for a fishing hook retaining apparatus and method that facilitates the storage of a hook when not in use, in a manner that is protective of the fly. The present invention satisfies these needs and provides other, related, advantages.

SUMMARY OF THE INVENTION

In accordance with one embodiment of the present invention, a fishing hook retaining apparatus is provided. The apparatus comprises, in combination: a sleeve having an interior of sufficient size to secure therein a barb and a point of at least one fish hook; wherein an underside of the sleeve is shaped to conform to a shaft of a fishing pole; means for securing the sleeve to the shaft; a channel in an upper surface of the sleeve, extending from a front edge of the sleeve part of the distance toward a rear edge of the sleeve.

In accordance with another embodiment of the present invention, fishing hook retaining apparatus is provided. The apparatus comprises, in combination: a sleeve having an interior of sufficient size to secure therein a barb and a point of at least one fish hook; wherein an underside of the sleeve is shaped to conform to a shaft of a fishing pole; means for securing the sleeve to the shaft; a channel in an upper surface of the sleeve, extending from a front edge of the sleeve part of the distance toward a rear edge of the sleeve; wherein an interior of the sleeve is divided into a first side and a second side; a magnet secured in the interior of the sleeve within the first side.

In accordance with another embodiment of the present invention, fishing hook retaining apparatus is provided. The apparatus comprises, in combination: a base; opposing sides projecting upward at a substantially ninety degree angle from the base; a bar interposed between the opposing sides; wherein the opposing sides are angled from a first end to a second end thereof, so that the bar is coupled at substantially the highest point of opposing sides.

In accordance with a further embodiment of the present invention, a method for retaining a fishing hook is provided. The method comprises: securing a fishing hook retaining apparatus to a shaft of a fishing pole; wherein the fishing hook retaining apparatus comprises, in combination: a sleeve having an interior of sufficient size to secure therein a barb and a point of at least one fish hook; wherein an underside of the sleeve is shaped to conform to a shaft of a fishing pole; means for securing the sleeve to the shaft; a channel in an upper surface of the sleeve, extending from a front edge of the sleeve part of the distance toward a rear edge of the sleeve; wherein an interior of the sleeve is divided into a first side and a second side; and a magnet secured in the interior of the sleeve within the first side; inserting the fish hook into an open end of the channel so that barb and the point are inside the sleeve; and inserting at least the point portion of the fish hook into the interior of the sleeve; positioning the fish hook so that at least a portion thereof is brought into contact with the magnet.

DETAILED DESCRIPTION OF THE PREFERRED EMBODIMENTS

Figure 1:
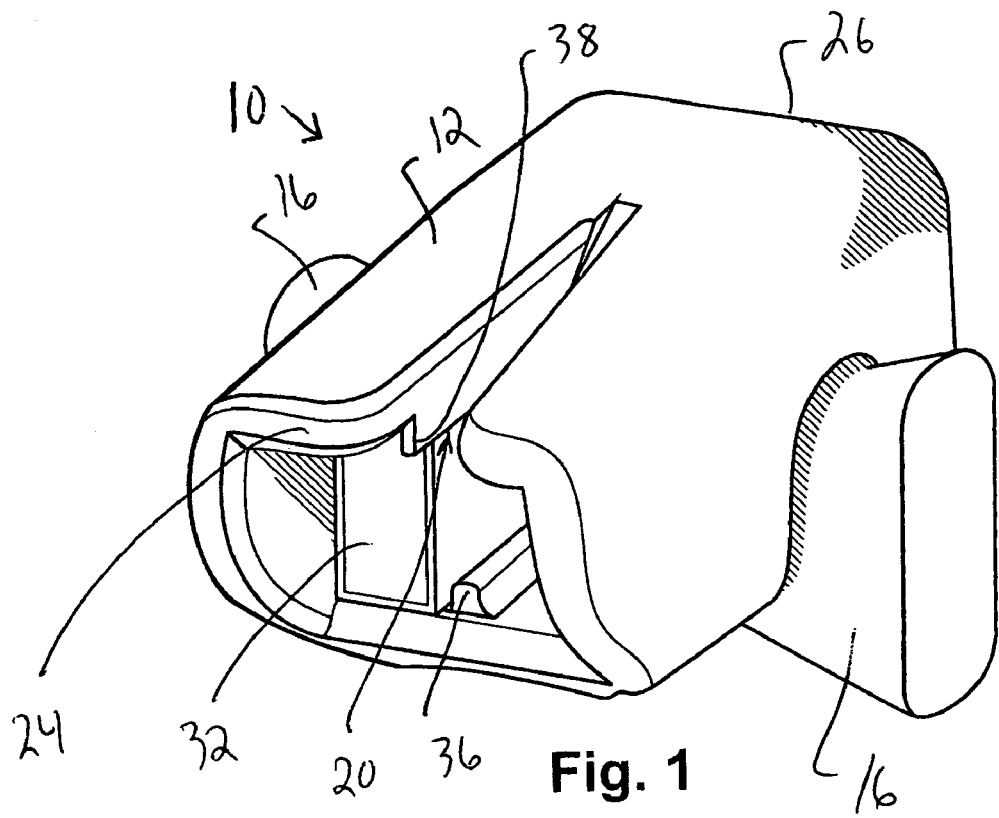
FIG. 1 is a perspective view of a fishing hook retaining apparatus consistent with an embodiment of the present invention.

Referring first to FIGS. 1–10, a fishing hook retaining apparatus 10 ("apparatus 10") consistent with an embodiment of the present invention is shown. In this embodiment, the apparatus 10 defines a sleeve 12. The underside 14 of the sleeve 12 is preferably shaped to conform to a fishing pole shaft 15. Projecting from each side of sleeve 12, substantially perpendicular thereto, may be securing members 16.

Figure 5:
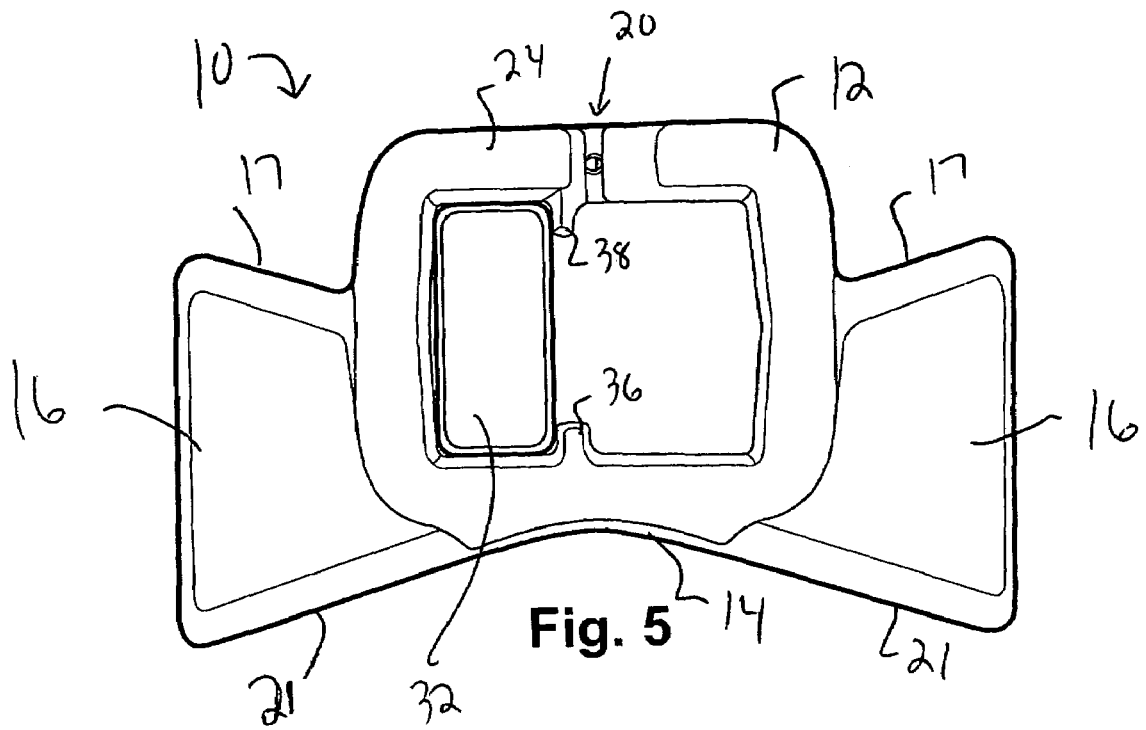
FIG. 5 is a front view of the fishing hook retaining apparatus of FIG. 1.
Figure 6:
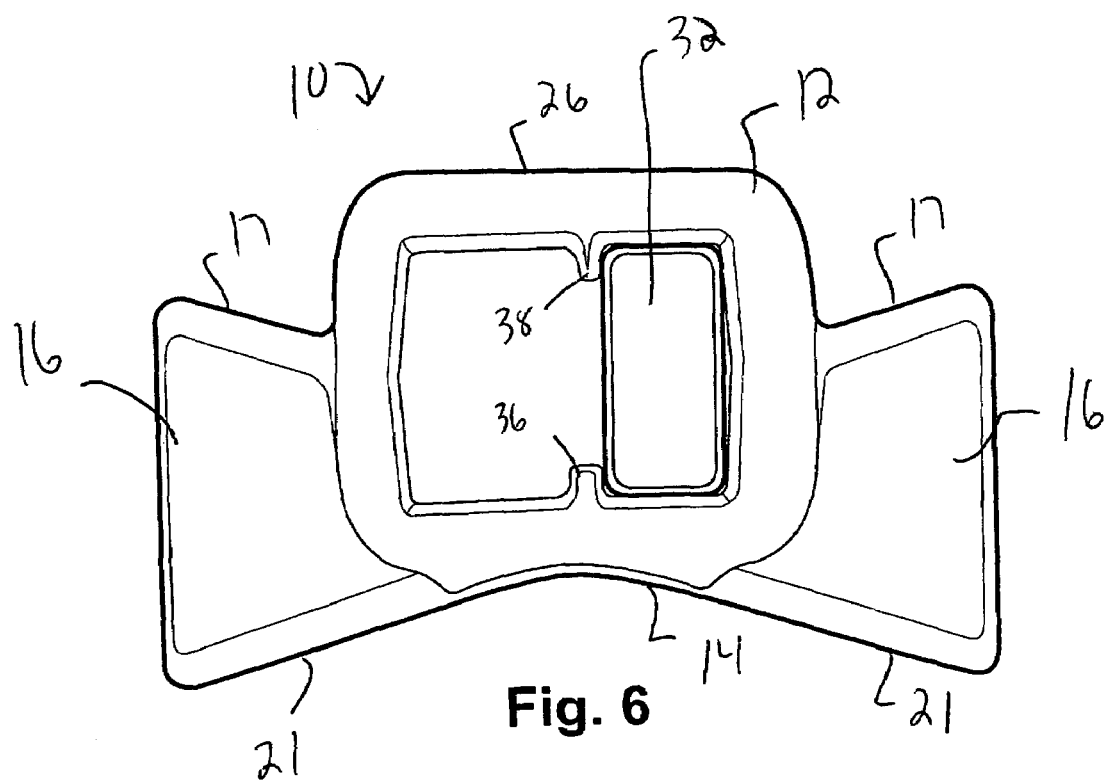
FIG. 6 is a rear view of the fishing hook retaining apparatus of FIG. 1.
Figure 7:
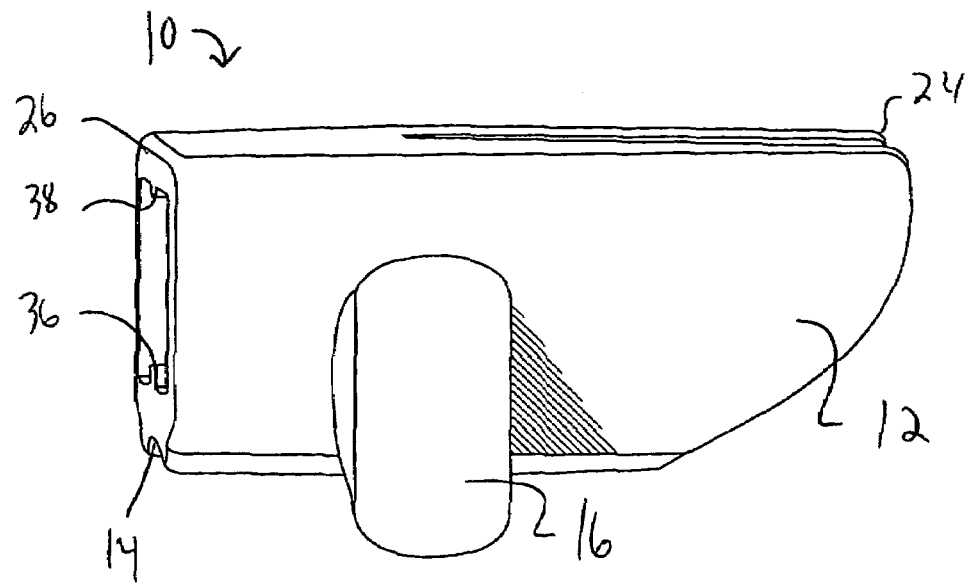
FIG. 7 is a first side view of the fishing hook retaining apparatus of FIG. 1.
Figure 8:
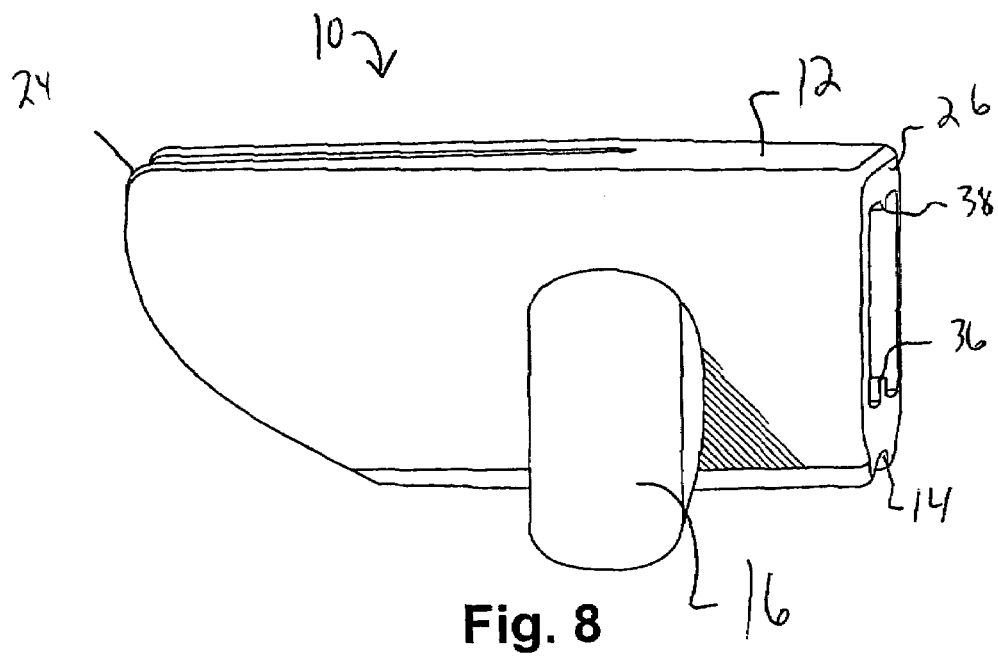
FIG. 8 is a second side view of the fishing hook retaining apparatus of FIG. 1.
Figure 9:
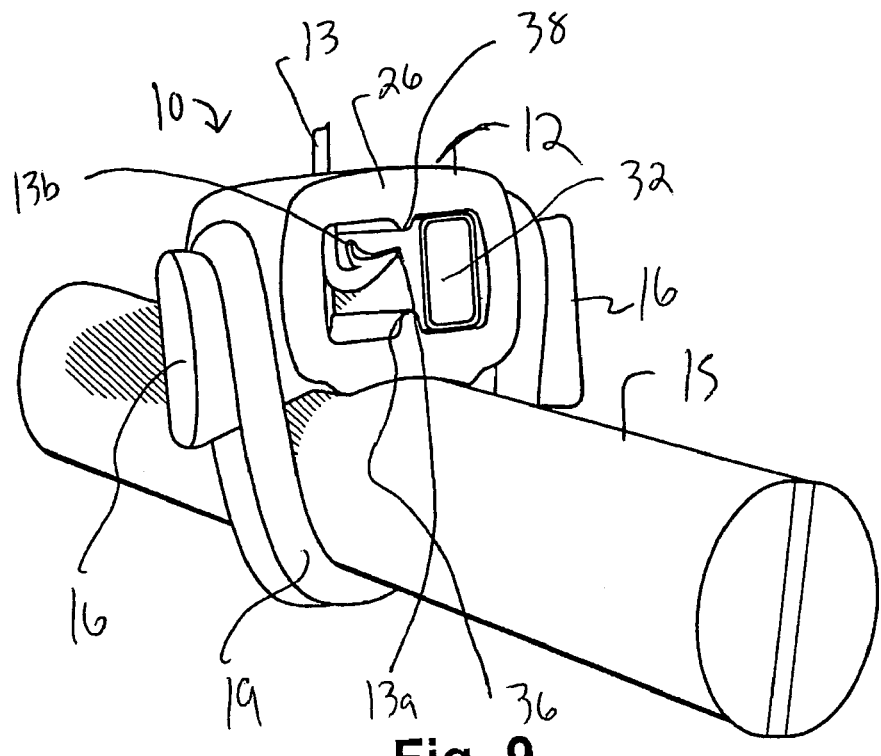
FIG. 9 is a perspective view of the fishing hook retaining apparatus of FIG. 1, with a hook therein and in position on a shaft of a fishing pole.
Figure 10:
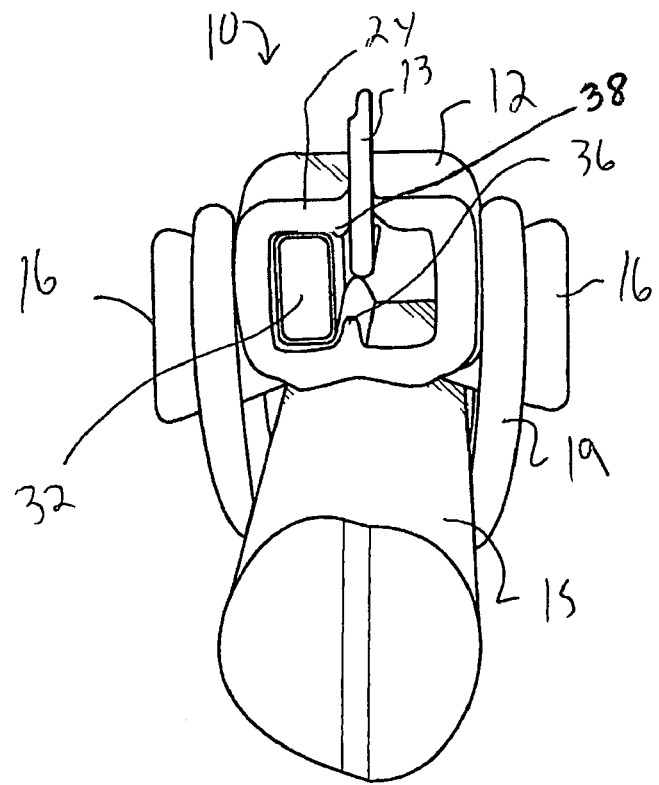
FIG. 10 is a front view of the fishing hook retaining apparatus of FIG. 1, with a hook therein and in position on a shaft of a fishing pole.
Figure 11:
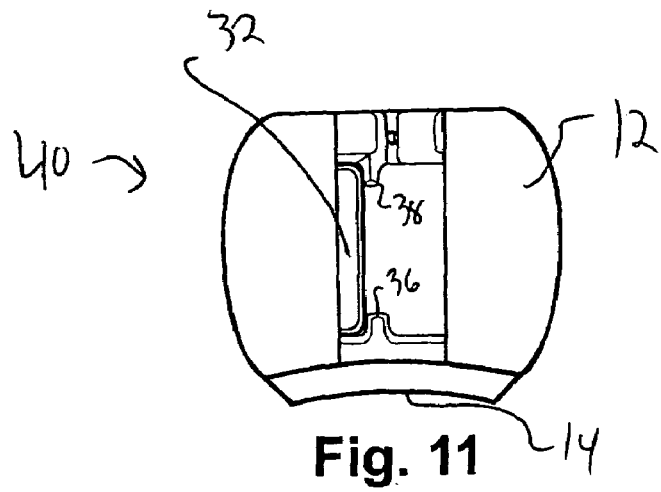
FIG. 11 is a front view of a fishing hook retaining apparatus, consistent with another embodiment of the present invention.
Figure 12:
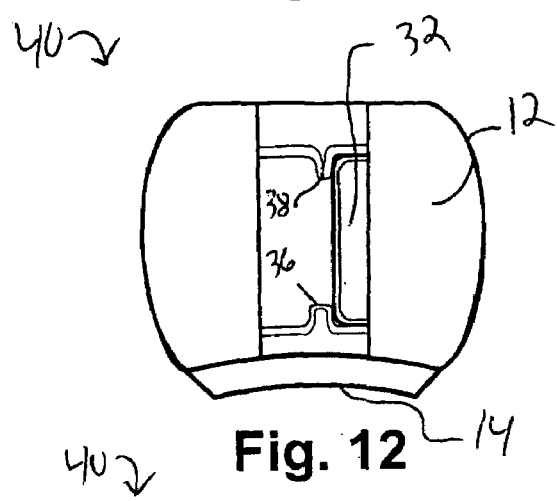
FIG. 12 is a rear view of the fishing hook retaining apparatus of FIG. 11.

As best seen in FIGS. 5–6, an upper surface 17 of each securing member 16 is preferably angled in an upward direction outward from the sleeve 12. The upward angling of the upper surface 17 is intended to facilitate, as described in more detail below, the securing of the apparatus 10 to the shaft 15 with an O-ring 19 (see FIGS. 9–10) or other fastener. As also seen in these drawing figures, a lower surface 21 of the securing member is preferably angled in a downward direction outward from the sleeve 12. The downward angling of the lower surface 21 is intended to further conform the lower surface generally of the apparatus 10 to the shape of the shaft 15 to which the apparatus 10 is being secured. It should be noted that where sufficient gripping force can be achieved with a particular O-ring or other fastener, it may be unnecessary to provide an upward angling of the upper surface 17, and/or to provide a downward angling of the lower surface 21.

Figure 2:
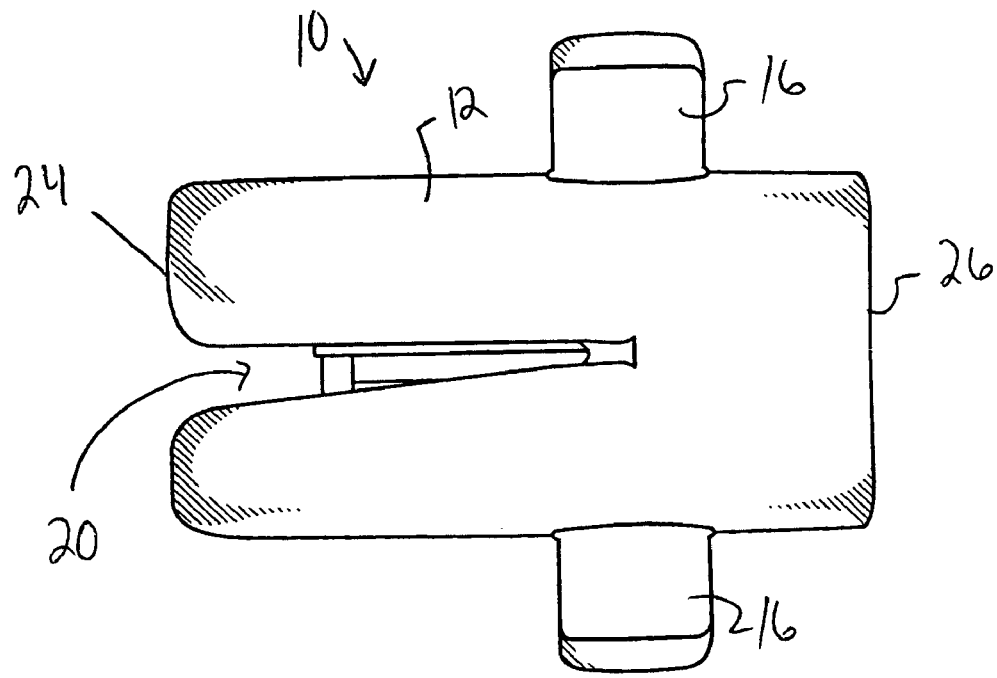
FIG. 2 is a top view of the fishing hook retaining apparatus of FIG. 1.
Figure 3:
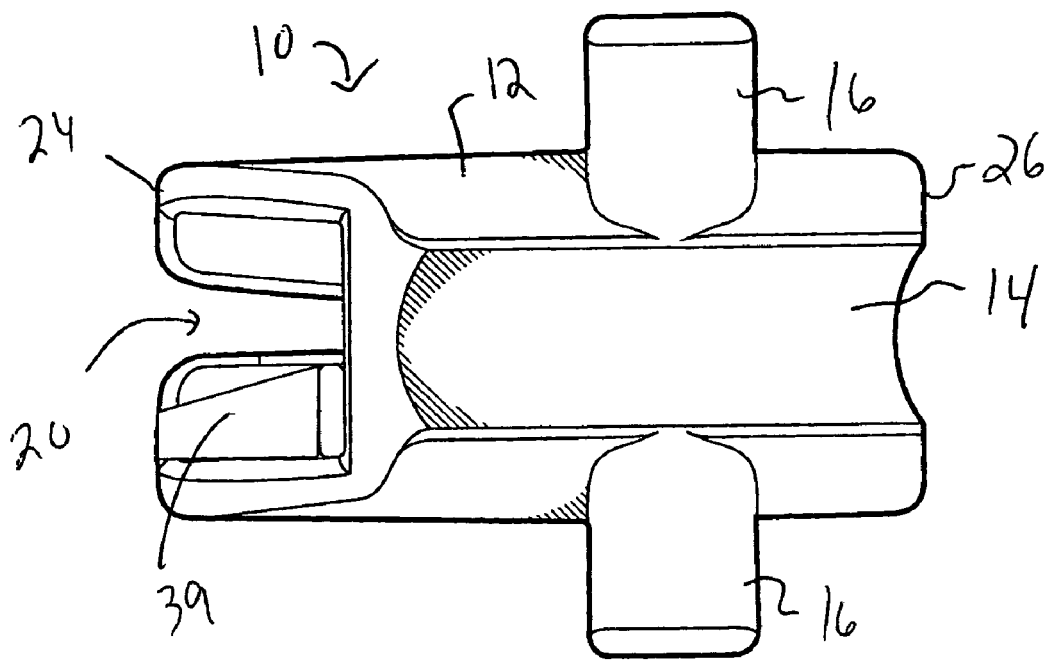
FIG. 3 is a bottom view of the fishing hook retaining apparatus of FIG. 1.
Figure 4:
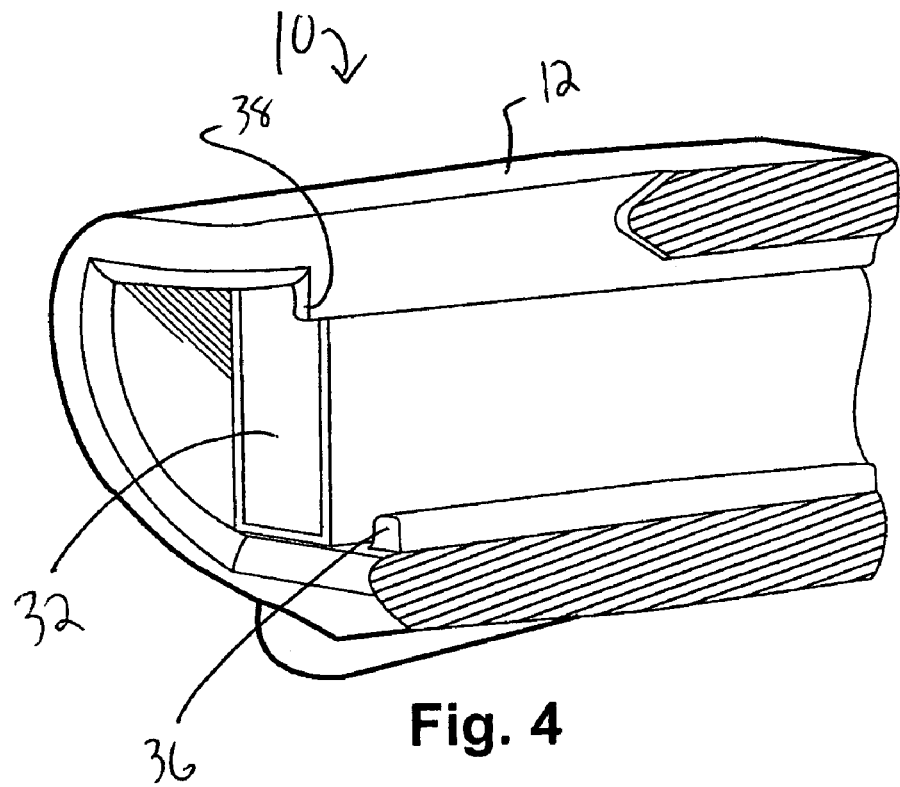
FIG. 4 is a side, cross-sectional view of the fishing hook retaining apparatus of FIG. 1.

It is preferred to provide a channel 20 in an upper surface of the sleeve 12, extending from a front edge 24 of sleeve 12 part of the distance toward rear edge 26 of the sleeve 12. Preferably, as shown in FIGS. 1, 2, 4, and 7–8, the channel 20 terminates before the rear edge 26, so that, as will be described more fully below, it will not be possible to pull a hook 13 all of the way through sleeve 12. As best seen in FIGS. 1–2, it is preferred that channel 20 have a substantially V-shape, so that the channel 20 narrows from its opening to its close. This tends to promote the positioning of the hook 13 relative to the magnet 32, as herein described in greater detail below, while also making insertion of the hook 13 into the channel 20 relatively easier for the user.

Turning now to a description of the interior of the sleeve 12, it is preferred that the interior be divided into a first side and a second side. Preferably, the first side is utilized to secure at least one magnet 32 therein. The second side is utilized to permit the insertion of some portion of a hook 13 therein, including, preferably, the hook point 13a and barb 13b. To facilitate a clear division of the interior of the sleeve 12 as herein described, and to promote ready securing of the magnet 32 in the first side, it may be desired to provide an upward projecting ridge 36 along a bottom interior length of the sleeve 12, and a downward projecting ridge 38 along a top interior length of the sleeve 12. As best seen in FIGS. 4–6 and 9–10, the magnet 32 may be secured in the first side by inserting it therein, so that a first side of the magnet 32 contacts an interior side of the sleeve 12, and a second side of the magnet 32 contacts each of ridges 36 and 38. It may be sufficient to press fit a magnet 32 into position, or it may be preferred to provide glue or other securing means to more securely retain it into position for use. As shown by way of example in FIG. 3, in one embodiment, it may be desired to provide a molded, angled portion 39 proximate the opening of the sleeve 12, against which an end of the magnet 32 would abut. This would further facilitate insertion of the hook 13 by facilitating its entry into the sleeve 12, and would prevent the hook 13 from being magnetically coupled to the magnet 32 until the hook 13 is in position within the interior of the sleeve 12.

It is preferred that the apparatus 10, other than the magnet 32, be a one-piece assembly. In particular, it is preferred that it be formed from a single piece of molded plastic, though other materials may be substituted as desired.

It should be noted that it may be desired to provide an apparatus having substantially the features of apparatus 10, without providing a magnet 32 therein. In such a configuration, securing of the hook 13 would be accomplished by, for example, the placement of tension on fishing line coupled between the hook 13 and a fishing reel.

It should be noted that one or more than one apparatuses 10 may be positioned along a shaft 15, as desired. The apparatuses 10 may be positioned above the shaft or below the shaft, proximate the handgrip or remote from it—as desired.

Figure 13:
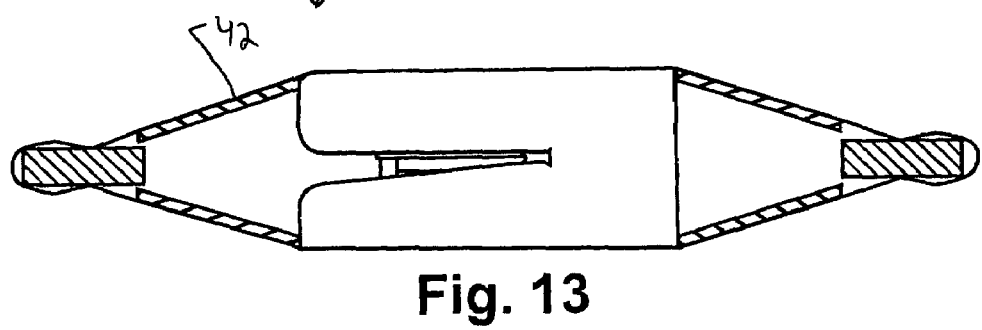
FIG. 13 is a top view of a fishing hook retaining apparatus, consistent with another embodiment of the present invention.
Figure 14:
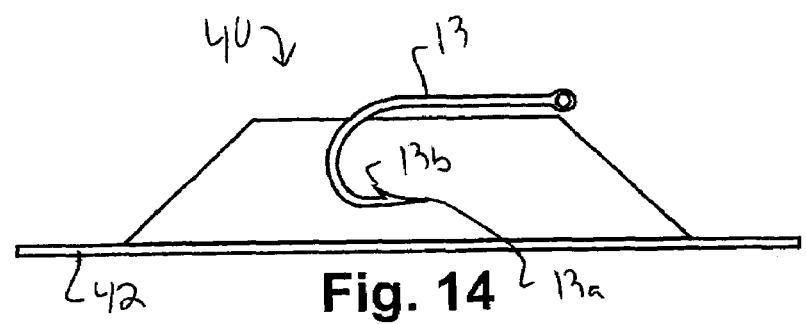
FIG. 14 is a side view of the fishing hook retaining apparatus of FIG. 13.

Referring now to FIGS. 11–14, a fishing hook retaining apparatus 40 ("apparatus 40") consistent with another embodiment of the present invention is shown. In this embodiment, the apparatus 40 preferably comprises many of the features identified above with respect to the embodiment of FIGS. 1–10, which are shown in FIGS. 11–14 using the same reference numbers as used above. The embodiment of FIGS. 11–14 is distinguished from the embodiment of FIGS. 1–10 by the elimination of the outwardly projecting securing members 16. In their stead, coupling of the apparatus 40 is accomplished by other means. For example, as shown in FIG. 13, a base 42 may be provided, extending beyond a front and rear end of the apparatus 40, which base 42 may be coupled to a fishing pole shaft (not shown) by any desired means, such as the retention of ends of the base 42 below a ring or other grasping means, the gluing of the base 42 to the fishing pole shaft, or otherwise.

The advantage of apparatus 40 as compared to apparatus 10 is the elimination of the O-ring, and the provision of a more permanent, more secure connection between the apparatus and the fishing pole shaft that does not require securing members 16. Other than with respect to the coupling thereof to the fishing pole shaft, the apparatus 40 functions like the apparatus 10 with respect to the insertion and storage of hooks therein.

Referring now to FIGS. 15–18, a fishing hook retaining apparatus 50 ("apparatus 50") consistent with another embodiment of the present invention is shown. In this embodiment, the apparatus 50 preferably comprises a base 52, opposing sides 54 projecting upward at a substantially ninety degree angle from the base 52, and a bar 56 interposed between the opposing sides 54.

Figure 15:
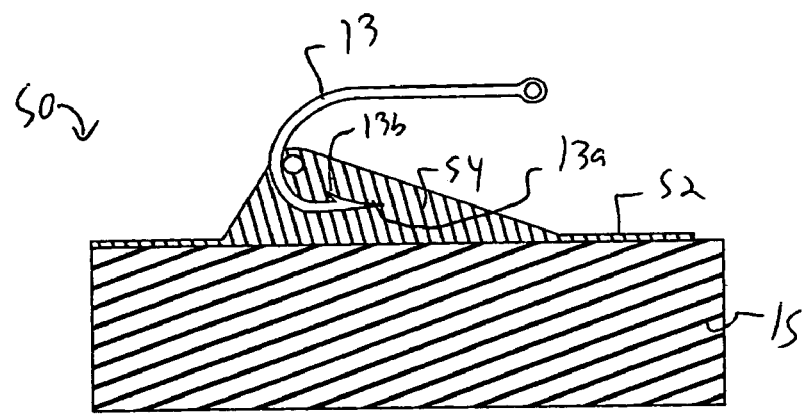
FIG. 15 is a side, cross-sectional view of a fishing hook retaining apparatus, consistent with another embodiment of the present invention.
Figure 16:
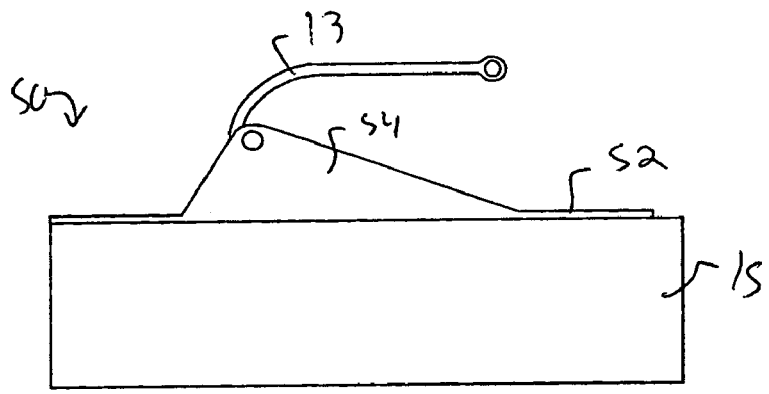
FIG. 16 is a side view of the fishing hook retaining apparatus of FIG. 15.
Figure 17:
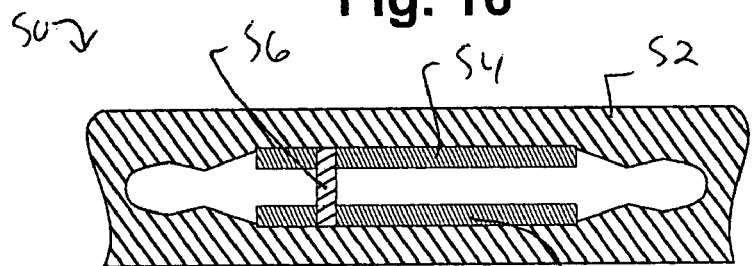
FIG. 17 is a top view of the fishing hook retaining apparatus of FIG. 15.
Figure 18:
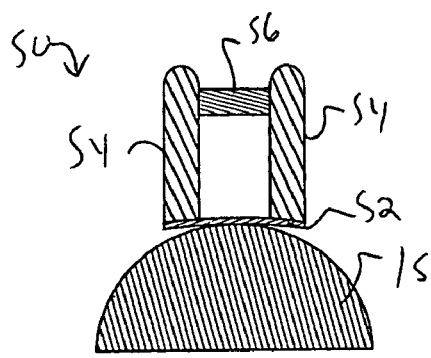
FIG. 18 is a front view of the fishing hook retaining apparatus of FIG. 15.
Figure 19:
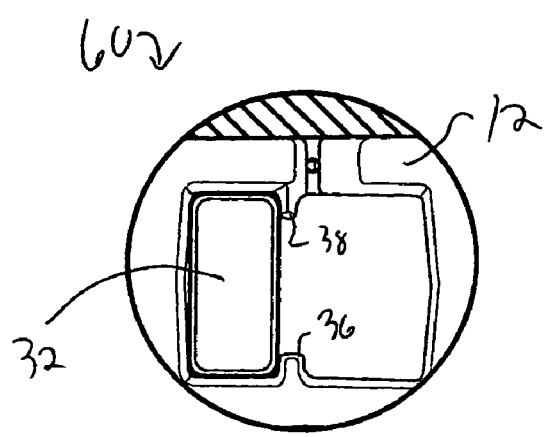
FIG. 19 is a front view of a fishing hook retaining apparatus consistent with another embodiment of the present invention.
Figure 20:
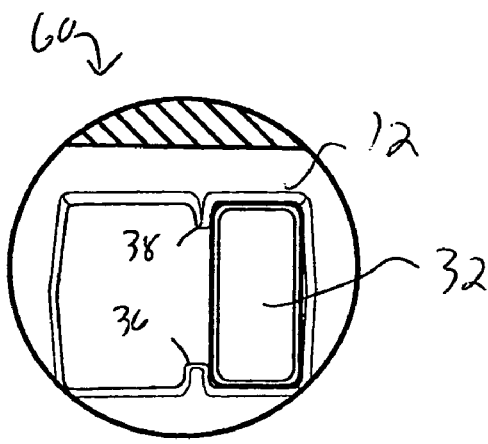
FIG. 20 is a rear view of the fishing hook retaining apparatus of FIG. 19.
Figure 21:
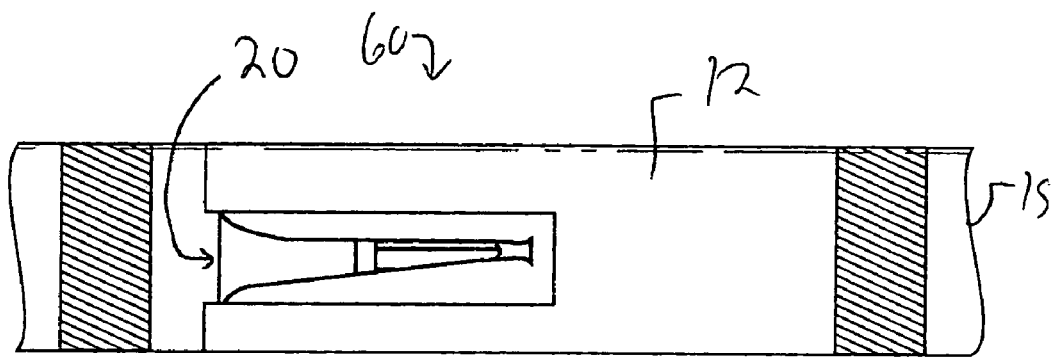
FIG. 21 is a top view a fishing hook retaining apparatus consistent with another embodiment of the present invention.

As best seen in FIGS. 15–16, it is preferred that the opposing sides 54 be angled from a first end to a second end thereof, so that the bar 56 is coupled proximate the highest point of opposing sides 54. This permits ready insertion of the hook 13, with the point 13a clearing the shaft 15 when in position. As noted above with respect to the base 42 of the embodiment of FIGS. 10–14, the base 52 may be coupled to a fishing pole shaft 15 by any desired means, such as the retention of ends of the base 52 below a ring or other grasping means, the gluing of the base 42 to the fishing pole shaft, or otherwise.

The apparatus 50 may be positioned along the shaft 15 as desired. In one embodiment, the apparatus 50 may be positioned proximate the handgrip, in the region where a keeper ring might otherwise be located.

The size of the apparatus 50 components can be varied as desired, taking into account the size of the hook 13 and/or shaft 15 with which it is to be used. A width of about 0.3" would be satisfactory for many uses, and a length of a top portion thereof of about 0.6" would similarly be suitable for certain uses. However, these dimensions can be varied.

Figure 22:
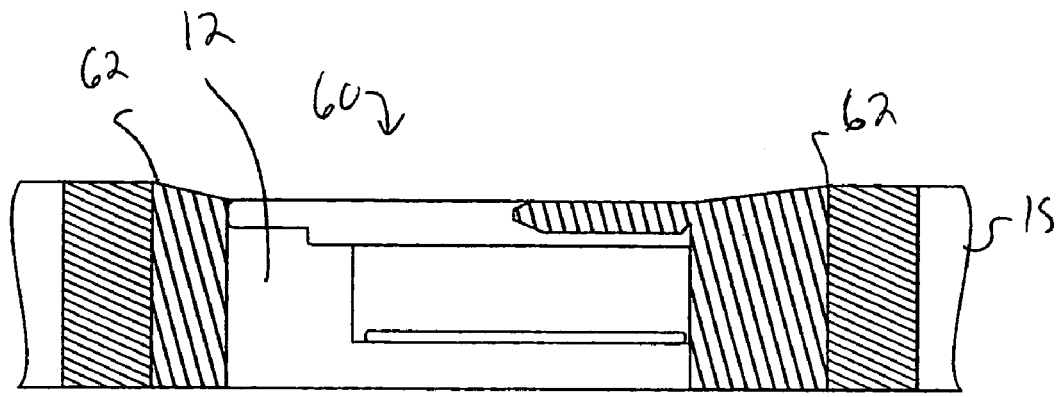
FIG. 22 is a cross-sectional side view of the fishing hook retaining apparatus of FIG. 21.

Referring now to FIGS. 19–22, a fishing hook retaining apparatus 60 ("apparatus 60") consistent with another embodiment of the present invention is shown. In this embodiment, the apparatus 60 preferably comprises many of the features identified above with respect to the embodiment of FIGS. 1–10, which are shown in FIGS. 19–22 using the same reference numbers as used above. The embodiment of FIGS. 19–22 is distinguished from the embodiment of FIGS. 1–10 by the elimination of the outwardly projecting securing members 16, and the integration of the apparatus 60 into the shaft 15. In this manner, the apparatus 60 will not protrude, or at least the amount of protrusion can be reduced, as compared to the apparatuses 10, 40 and 50 described above. This can serve to limit any interference that the apparatus 60 might otherwise cause with fishing activities. As best seen in FIG. 22, it may be desired to slightly recess a top portion of the sleeve 12, creating a slight stop 62 at either or both ends thereof, to further reduce the profile thereof.

The size of the apparatus 10, 40, 50 and/or 60 components can be varied as desired, taking into account the size of the hook 13 and/or shaft 15 with which it is to be used. A width for the sleeve 12 of between about 0.2 and 0.25" would be satisfactory for many uses, and a length of the sleeve 12 of about 0.6" would similarly be suitable for certain uses. A sleeve height of between about 0.2 and 0.25" would similarly be suitable for certain uses. However, these dimensions can be varied as desired without departing from the spirit or scope of the present invention.

It should be understood that the invention is not necessarily limited to the specific arrangement, materials and components shown and described above, but may be susceptible to numerous variations within the scope of the invention. It will be understood that the above description of the preferred embodiments of the present invention are susceptible to various modifications, changes and adaptations, and the same are intended to be comprehended within the meaning and range of equivalents of the appended claims.

I claim:

1. A fishing hook retaining apparatus comprising, in combination:
   a sleeve having an interior of sufficient size to secure therein a barb and a point of at least one fish hook;
   wherein an underside of the sleeve is shaped to conform to a shaft of a fishing pole;
   means for securing the sleeve to the shaft;
   a channel in an upper surface of the sleeve, extending from a front edge of the sleeve part of the distance toward a rear edge of the sleeve;
   wherein an interior of the sleeve is divided into a first side and a second side;
   a magnet secured in the interior of the sleeve within the first side; and
   an upward projecting ridge along a bottom interior length of the sleeve and a downward projecting ridge along a top interior length of the sleeve, and wherein a first side of the magnet contacts an interior side of the sleeve, and a second side of the magnet contacts each of upward projecting and downward projecting ridges.

2. The apparatus of claim 1 wherein the securing means comprises securing members projecting from each side of the sleeve, substantially perpendicular thereto.

3. The apparatus of claim 1, wherein:
   the securing means comprises securing members projecting from each side of the sleeve, substantially perpendicular thereto;
   a fastener capable of securing the apparatus to the shaft utilizing the securing members; and
   wherein the fastener is an O-ring sized to permit a looping of a portion thereof over one of the securing members and a looping of a second portion thereof over the second of the securing members, with the shaft passing between the O-ring and the underside of the sleeve.

4. The apparatus of claim 2 wherein an upper surface of each securing member is angled in an upward direction outward from the sleeve.

5. The apparatus of claim 2 wherein a lower surface of each securing member is angled in a downward direction outward from the sleeve.

6. The apparatus of claim 4 wherein a lower surface of each securing member is angled in a downward direction outward from the sleeve.

7. The apparatus of claim 1 wherein the channel terminates before the rear edge of the sleeve.

8. The apparatus of claim 7 wherein the channel has a substantially V-shape, so that the channel narrows from its opening to its close.

9. The apparatus of claim 1 wherein each component thereof, other than the magnet, is formed from a single piece of molded plastic.

10. The apparatus of claim 2, further comprising a fastener capable of securing the apparatus to the shaft utilizing the securing members.

11. The apparatus of claim 10, wherein the fastener is an O-ring sized to permit a looping of a portion thereof over one of the securing members and a looping of a second portion thereof over the second of the securing members, with the shaft passing between the O-ring and the underside of the sleeve.

12. The apparatus of claim 4 wherein the securing means comprises a base extending beyond a front end of the sleeve and extending beyond a rear end of the sleeve.

13. A method for storing a fishing hook comprising:
   securing a fishing hook retaining apparatus to a shaft of a fishing pole;
   wherein the fishing hook retaining apparatus comprises, in combination:
      a sleeve having an interior of sufficient size to secure therein a barb and a point of at least one fish hook;
      wherein an underside of the sleeve is shaped to conform to a shaft of a fishing pole;
      means for securing the sleeve to the shaft;
      a channel in an upper surface of the sleeve, extending from a front edge of the sleeve part of the distance toward a rear edge of the sleeve;
      wherein an interior of the sleeve is divided into a first side and a second side;
      a magnet secured in the interior of the sleeve within the first side; and
      an upward projecting ridge along a bottom interior length of the sleeve and a downward projecting ridge along a top interior length of the sleeve, and wherein a first side of the magnet contacts an interior side of the sleeve, and a second side of the magnet contacts each of upward projecting and downward projecting ridges;

inserting the fish hook into an open end of the channel so that barb and the point are inside the sleeve; and inserting at least the point portion of the fish hook into the interior of the sleeve;

positioning the fish hook so that at least a portion thereof is brought into contact with the magnet.

14. The method of claim 13 wherein the securing means comprises securing members projecting from each side of the sleeve, substantially perpendicular thereto, and wherein the step of securing the fishing hook retaining apparatus to the shaft includes the step of looping a portion of an O-ring over each of the securing members, with the shaft passing between the O-ring and the underside of the sleeve.

* * * * *